April 14, 1942. G. A. LYON 2,279,333
ORNAMENTAL WHEEL MEMBER AND ASSEMBLY
Filed Oct. 6, 1939 2 Sheets-Sheet 1
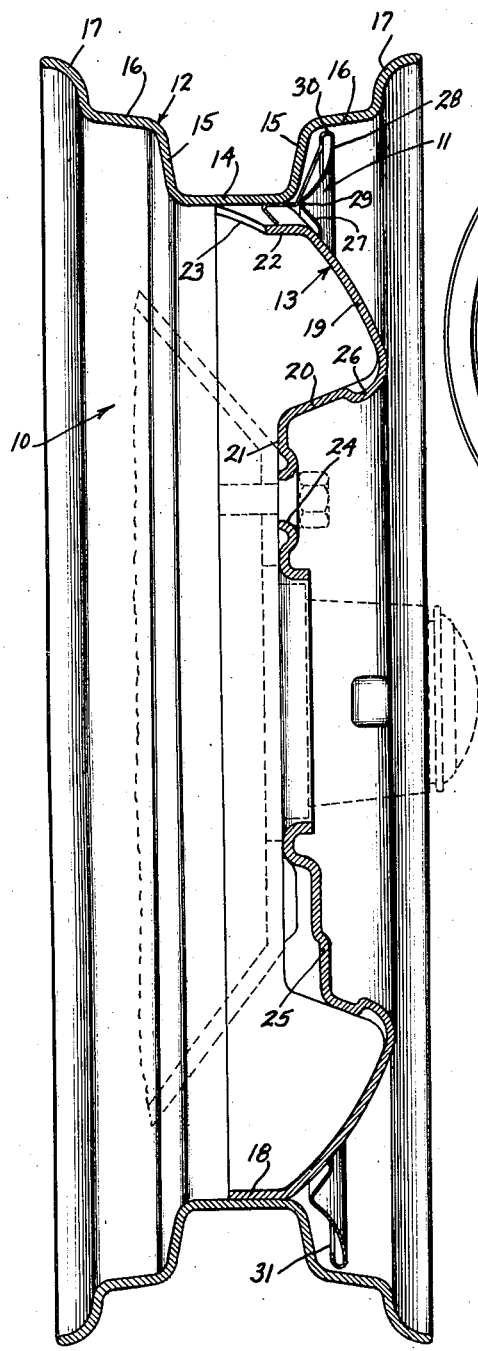
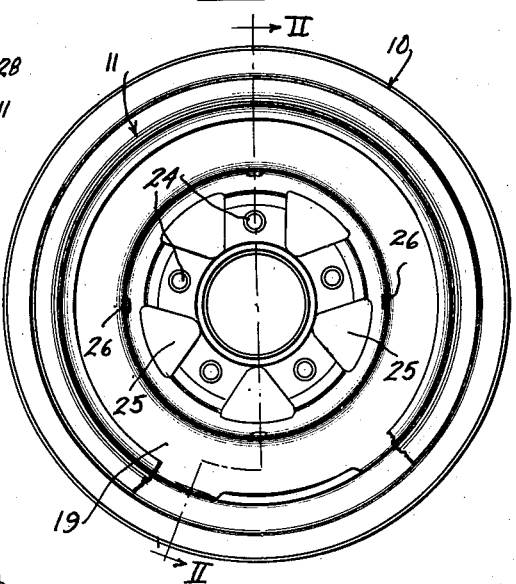
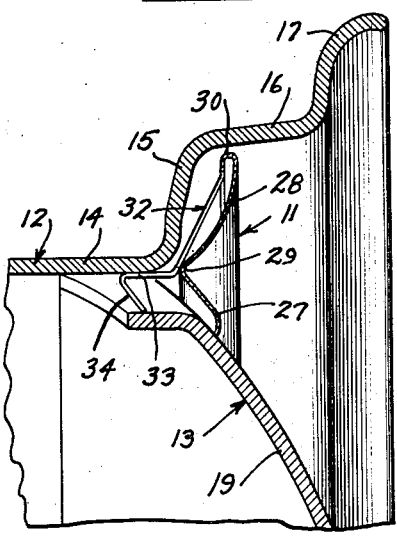
Inventor
GEORGE ALBERT LYON.

April 14, 1942. G. A. LYON 2,279,333
ORNAMENTAL WHEEL MEMBER AND ASSEMBLY
Filed Oct. 6, 1939 2 Sheets-Sheet 2
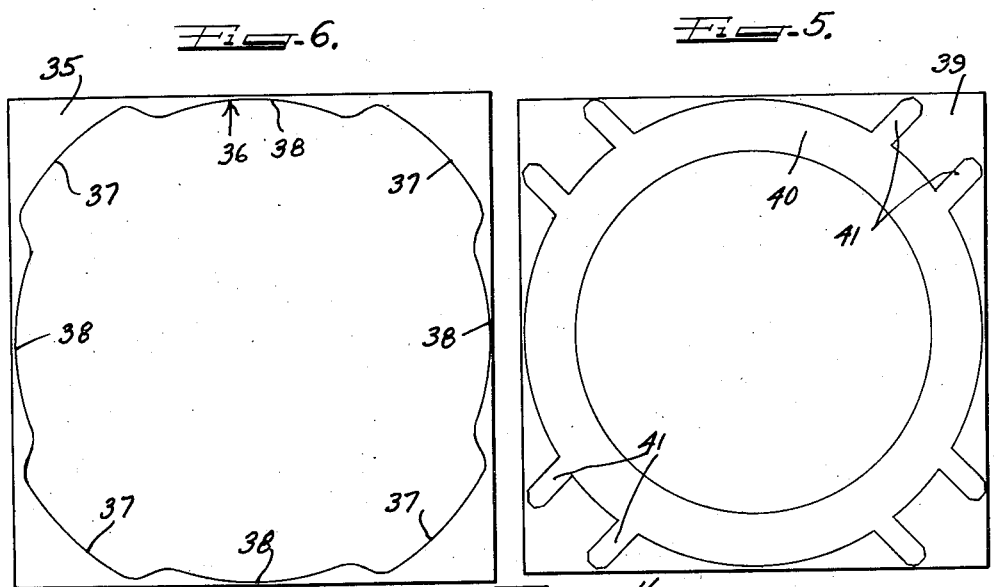
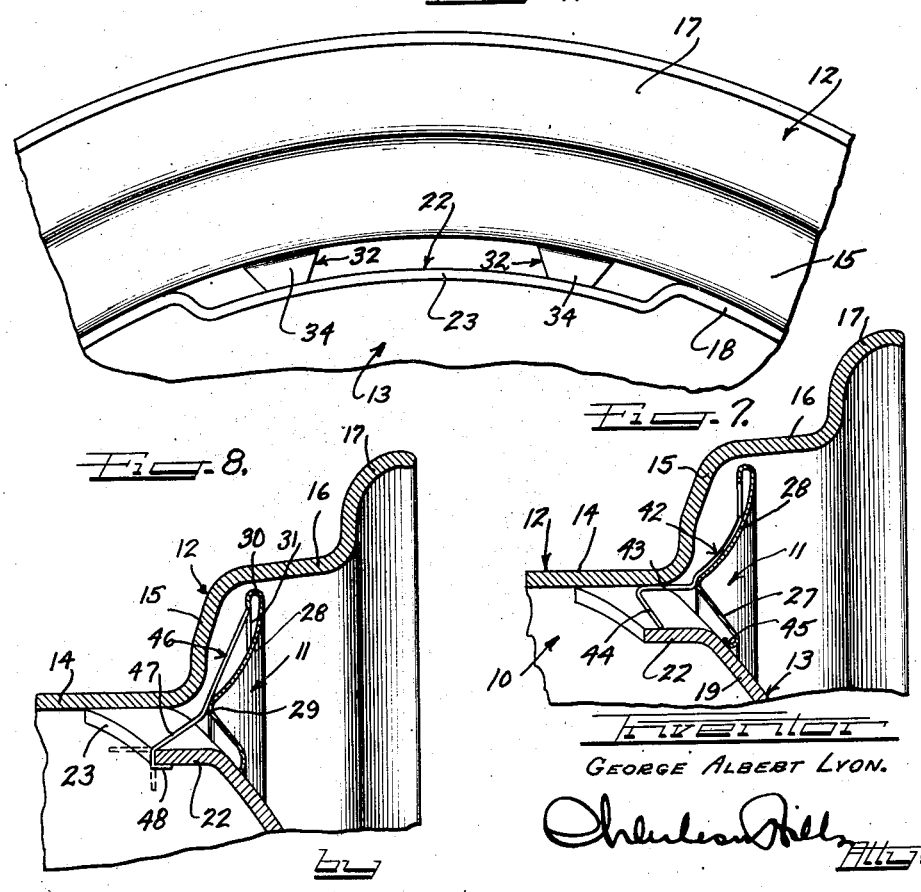
George Albert Lyon.

Patented Apr. 14, 1942

2,279,333

UNITED STATES PATENT OFFICE 2,279,333

ORNAMENTAL WHEEL MEMBER AND ASSEMBLY

George Albert Lyon, Allenhurst, N. J.

Application October 6, 1939, Serial No. 298,218

13 Claims. (Cl. 41—10)

This invention relates to an ornamental wheel member and wheel assembly, and more particularly to a novel sheet metal annular ornamental member which is secured to the outer face of a vehicle wheel in a novel manner.

Vehicle wheels of the present day which are employed on passenger cars are almost universally equipped with ornamental members on their outer faces. This provision of ornamental members on the outer faces of vehicle wheels greatly enhances the appearance of the wheels and at the same time permits a more economical manufacture of the vehicle wheels since the wheels themselves may be designed solely for strength and utility without regard to ornamental appearance, the ornamental members being employed for the latter purpose.

It is an object of the present invention to provide a novel form of sheet metal member which is arranged to be mounted on the outer face of a vehicle wheel.

Another object of the present invention is to provide a novel ornamental wheel member which is arranged to conceal the junction between the wheel body part and the wheel rim.

A further object of the present invention is to provide a novel method and means for securing an ornamental member to a vehicle wheel.

Another and further object of the present invention is to provide a novel method of manufacturing and forming a sheet metal ornamental member which is arranged to be mounted on the outer face of a vehicle wheel.

Another and still further object of the present invention is to provide a novel wheel and ornamental member assembly which is economical to manufacture and which is rugged and reliable in use.

The novel features which I believe to be characteristic of my invention are set forth with particularity in the appended claims. My invention itself, however, both as to its organization and manner of construction, together with further objects and advantages thereof, may best be understood by reference to the following description taken in connection with the accompanying drawings, in which:

Figure 1 is a front view of a vehicle wheel which is equipped with an ornamental member constructed in accordance with the teachings of the present invention, a portion of the ornamental member being broken away to better illustrate the construction of the wheel;

Figure 2 is an enlarged cross-sectional elevational view taken along the line II—II of Figure 1;

Figure 3 is an enlarged fragmentary sectional view of the upper portion of Figure 2;

Figure 4 is an enlarged fragmentary rear view showing the manner in which the attaching fingers of the ornamental member engage the wheel;

Figure 5 illustrates a square of sheet metal stock and the manner in which the ornamental member is stamped therefrom;

Figure 6 illustrates the manner in which the body part of the vehicle wheel is stamped from a square of metal stock;

Figure 7 illustrates a second embodiment of the present invention and is a view similar to Figure 3; and Figure 8 is a third embodiment of the present invention and is a view similar to Figures 3 and 7.

Referring now to the first embodiment of the present invention which is illustrated in Figures 1 to 4 of the drawings, there is shown therein a wheel assembly comprising a vehicle wheel 10 and an ornamental wheel member 11. The wheel 10 comprises a rim part 12 and a body part 13. The rim 12 is of the usual drop center type and includes a base flange 14, opposite intermediate side flanges 15, opposite intermediate base flanges 16, and opposite edge portions 17. The drop center rim 12 is illustrated as of the type which is commonly employed in the automotive vehicle art of the present day, and, as is well known to those skilled in the art, is arranged to receive and accommodate a pneumatic tire (not shown).

The body part 13 of the wheel 10 includes, in general, a rearwardly extending flange 18, an outer web or nave portion 19, a generally axially rearwardly and slightly radially inwardly extending flange 20, and a radially inwardly extending wheel mounting flange 21. The rearwardly extending outer flange 18 is secured to the underside of the base flange 14 of the rim 10 in any suitable manner such as by riveting, welding or the like. The flange 18 is provided with a plurality of circumferentially spaced depressed portions 22, the rear edges of which are cut back as at 23.

The wheel mounting flange 21 is provided with an annular series of apertures 24, for the reception of the usual wheel mounting bolts 49 which are employed to detachably secure the wheel 10 to the wheel mounting elements 50 on the vehicle. The radially extending flange 21 is also provided with a plurality of depressed radially extending portions 25 which form radial ribs in the wheel 10. These radial ribs 25 greatly increase the strength of the wheel as will at once be apparent to those skilled in the art.

Circumferentially spaced radially inwardly projecting protuberances 26 are provided in the flange or shoulder 20 in proximity to the junction of the shoulder 20 with the web or nave portion 19. While for purposes of clarity, a hub cap or wheel disk is not shown as being mounted on the wheel, it will of course be understood that such a member will usually be employed to conceal the wheel mounting bolts and to cover the central portion of the wheel.

The ornamental member 11 is formed of relatively thin sheet metal stock. I have found that stainless steel having approximately 18% chromium and 8% nickel provides a very good type of material for this purpose. It is to be understood, however, that any sheet material may be employed which is suitable for the purpose without departing from the spirit and scope of the present invention.

The ornamental member 11 is shaped to have a body portion 27 which extends down over a portion of the wheel body part 13 and a second body portion 28 which is arranged to substantially conceal the side flange 15 on the front face of the wheel. The depressed groove portion 29 which forms the junction of portions 27 and 28 is arranged to be disposed substantially opposite but spaced from the junction of the wheel body part 13 with the wheel rim 12. The outer edge of the ornamental member 11 is curled inwardly as at 30 and terminates in an edge which extends generally radially inwardly as at 31.

Novel fastening and securing means are provided for the ornamental member 11 by employing a plurality of integral fingers 32 which extend radially inwardly and axially rearwardly from the edge 31 of the member 11. These fingers 32 are shaped to bear against and be seated on the depressed portion 29 where they are preferably welded and then to extend directly axially rearwardly along a portion of the underside of the base flange 14 of the rim 12 as at 33, and are then bent axially forwardly and radially inwardly into tip portions 34. The tip portions 34 of the fingers 32 are arranged to make a biting engagement with the depressed portions 22 of the flange 18. The fingers 32 are preferably provided in pairs so that two fingers will extend into and engage with each depressed portion 22 of the wheel 10 (see Figure 4).

To mount the ornamental member 7 on the wheel 10, the member 11 is centered and the fingers 32 are aligned with the openings provided by the detent portions 22 in the wheel and then member 11 is forced axially rearwardly into engagement with the wheel 10. The extremities 34 of the fingers 32 are forced rearwardly into the openings provided by the depressed portions 22 where they make a biting engagement therewith. By virtue of the fact that the springs 32 engage the depressed portions 29 in the member 11 and also are slidingly seated on the under surface of the base flange 14 of the rim 12, it will at once be apparent that these fingers are greatly stiffened so as to provide a very firm and binding engagement of the ornamental member 11 on the wheel 10.

Referring next to Figures 5 and 6 of the drawings, reference will now be made to the novel manner of cutting the ornamental member from a square of sheet metal stock. In Figure 5, I have shown a blank of relatively thin sheet metal stock from which the ornamental member 11 is cut. In Figure 6 I have shown a square blank of relatively heavy stock from which the body part 13 of the wheel 10 is cut. The square blank 35 in Figure 6 from which the body part 13 of the wheel 10 is cut is so dimensioned that a minimum amount of waste is obtained. More particularly the blank from which the wheel body part 13 is formed is cut along the line 36 and includes four projections 37 at the four corners and four arcuate portions 38 along the sides. The portions 37 form the flange 18 of the wheel 10 upon which the base flange 14 of the rim is seated and secured. The portions 38 form the depressed portions 22, the arcuate line of cut in each section 38 of the blank 35 being the rear edge 23 as shown in Figure 2.

The blank 39 of relatively thin sheet metal material as shown in Figure 5 is so laid out that the annular portion 40 forms the body portions 27 and 28 of the ornamental member 11 while the fingers 32 are formed from the projecting ears 41 which are stamped out of the four corners of the blank 39 as is clearly shown in Figure 5. The relation of the blank cut from the stock as shown in Figure 5 with respect to the blank cut from the stock shown in Figure 6 is such that by rotating the blank 39 forty-five degrees the ears 41 would be opposite the line of cut 38 in Figure 6. This is precisely the arrangement of the respective elements after they have been stamped or pressed into their desired final form. More particularly, the ears 41 which are bent to form the fingers 32 of Figure 2 are arranged to engage the depressed portion 22 which is formed from the part 38. By a comparison of the relative dimensions of Figures 5 and 6, it will readily be seen that by forming the fingers from the four corners of the blank, a sufficient radial dimension is obtained to have the fingers engage the depressed portion 22 formed by the line of cut 38 in the blank 35 of Figure 6.

In Figure 7, I have illustrated a modified form of the present invention wherein an ornamental member 11 is provided which is similar in shape to that shown in Figures 2 and 3 but wherein a plurality of fingers 42 are welded or otherwise suitably secured to the rear face of the body portion 28 of the member 11. The fingers 42 project rearwardly in an axially extending portion 43, telescope the undersurface of the base flange 14 of the rim 12 and terminate in a tip portion 44 which is bent axially forwardly and radially inwardly and is arranged to extend into sliding engagement with the depressed portion 22 of the wheel 10.

In this form of the invention, I have also shown a curled inner edge 45 of the ornamental member 11 which is arranged to be seated on the web or nave part 19 of the wheel 10.

In Figure 8 of the drawings I have illustrated a third embodiment of the present invention wherein the ornamental member 11 is of substantially the same shape as that shown in Figures 2 and 3 but wherein the fingers are arranged to be bent around the rear edge 23 of the depressed portion 22 rather than to extend into biting engagement therewith. More particularly, the ornamental member 11 as shown in Figure 8 is provided with a plurality of fingers 46 which are formed integrally with the member 11 and which extend radially inwardly and axially rearwardly from the outer edge 31 of the member 11. The fingers 36 extend behind the body portion 28 of the member 11 and are spaced therefrom and then extend past the depressed portion 29 and in direct contact therewith. From the point of contact with the depressed portion 29, the fingers 46 are bent axially rearwardly at a greater angle than the portion adjacent the outer edge of the member 11 as at 47 and are then bent around the rear edge 23 of the depressed portion 22 of the wheel 10 as at 48. In this form of the invention, it will be noted that the fingers 26 do not directly engage the base flange 14 of the rim 12.

While I have shown particular embodiments of my invention, it will of course be understood that I do not wish to be limited thereto as many modifications may be made and I, therefore, contemplate by the appended claims to cover all such modifications as fall within the true spirit and scope of my invention.

I claim as my invention:

1. A trim ring for vehicle wheels comprising an annular sheet metal member having a plurality of fingers projecting from one edge thereof across the major portion of the rear face of the ring, then projecting axially rearwardly, and terminating in a tip portion bent obliquely axially forwardly at an acute angle to said axially rearwardly projecting portion, said tip portion being arranged to be pressed into retaining engagement with a vehicle wheel.

2. A trim ring for vehicle wheels comprising an annular sheet metal member having a plurality of fingers projecting from one edge thereof across the major portion of the rear face of the ring, then projecting axially rearwardly, and terminating in a tip portion bent obliquely axially forwardly at an acute angle to said axially rearwardly projecting portion, said tip portion being arranged to be pressed into retaining engagement with a vehicle wheel, said fingers being seated on said ring at a point spaced from said edge.

3. A trim ring for vehicle wheels comprising an annular sheet metal member having a plurality of fingers projecting from one edge thereof across the major portion of the rear face of the ring, then projecting axially rearwardly, and terminating in a tip portion bent obliquely axially forwardly at an acute angle to said axially rearwardly projecting portion, said tip portion being arranged to be pressed into retaining engagement with a vehicle wheel, said fingers being seated on said ring at a point spaced from said edge, the portion of said fingers lying between said seat and said edge being spaced from said rear face of said ring.

4. A trim ring for a vehicle wheel comprising an annular sheet metal member having a plurality of integral fingers projecting generally radially inwardly from the outer edge of and in spaced relation to the rear face of said ring, then generally actively rearwardly in a portion arranged for telescoping sliding engagement with part of a vehicle wheel, and terminating in a tip portion bent obliquely axially forwardly at an acute angle to said axially rearwardly extending portion, said tip portion being arranged to make a snap-on biting engagement with the vehicle wheel to retain said trim ring thereon.

5. A trim ring for a vehicle wheel comprising an annular sheet metal member having a plurality of integral fingers projecting generally radially inwardly from the outer edge of and in spaced relation to the rear face of said ring, then generally actively rearwardly in a portion arranged for telescoping sliding engagement with part of a vehicle wheel, and terminating in a tip portion bent obliquely axially forwardly at an acute angle to said axially rearwardly extending portion, said tip portion being arranged to make a snap-on biting engagement with the vehicle wheel to retain said trim ring thereon, said radially inwardly extending portion of said fingers being seated on a portion of said ring at a point faced radially inwardly from the outer edge of said ring.

6. A trim ring for vehicle wheels comprising an annular sheet metal member having a plurality of integral fingers projecting generally radially inwardly from the outer edge of said ring and in spaced relation to the rear face thereof, then generally axially rearwardly in a portion arranged for telescoping sliding engagement with part of a vehicle wheel, and terminating in a tip portion arranged to be bent around an opening defining edge of the vehicle wheel.

7. A trim ring for vehicle wheels comprising an annular sheet metal member having a plurality of fingers secured to the rear face thereof, said fingers each including a base portion seated on and secured to the rear face of said ring, a generally axially rearwardly extending portion arranged for telescopic sliding engagement with part of a vehicle wheel, and a tip portion bent obliquely axially forwardly at an acute angle to said axially rearwardly extending portion, said tip portion being arranged to make a snap-on biting engagement with the vehicle wheel.

8. In a wheel assembly including a wheel having rim and body parts, said rim part including a base flange and said body part including a rearwardly extending flange upon which said base flange is seated and secured, circumferentially spaced portions of said second flange being depressed radially inwardly forming spaced opposed faces on said flanges; a trim ring for disposition on said wheel and concealing the junction of said rim and body part, said ring having a plurality of integral attaching fingers which extend radially inwardly from the outer edge of said ring, then axially rearwardly in telescoping sliding engagement with said base flange of said rim, and terminating in a tip portion which extends obliquely axially forwardly from said base flange into biting engagement with said spaced face of said body part flange.

9. In a wheel assembly including a wheel having rim and body parts, said rim part including a base flange and said body part including a rearwardly extending flange upon which said base flange is seated and secured, circumferentially spaced portions of said second flange being depressed radially inwardly forming spaced opposed faces on said flanges; a trim ring for disposition on said wheel having a depressed annular portion disposed substantially opposite the junction of said rim and body part, said ring having a plurality of integral attaching fingers which extend radially inwardly from the outer edge of said ring in spaced relation thereto, then axially rearwardly in telescoping biting engagement with said base flange of said rim, and terminating in a tip portion which extends obliquely axially forwardly from said base flange in sliding engagement with said spaced face of said body part flange, said fingers being seated on and bearing against said depressed annular portion of said ring.

10. In a wheel assembly including a wheel having rim and body parts, said rim part including a base flange and said body part including a rearwardly extending flange upon which said base flange is seated and secured, circumferentially spaced portions of said second flange being depressed radially inwardly forming spaced opposed faces on said flanges; a trim ring for disposition on said wheel and concealing the junction of said rim and body parts, said ring having a plurality of integral attaching fingers which extend radially inwardly from the outer edge of said ring, then generally axially rearwardly and obliquely radially inwardly, and terminating in a tip portion which is bent around the rear edge of said body part flange which is spaced from said base flange of said rim.

11. In a wheel assembly including a wheel having rim and body parts, said rim part including a base flange and said body part including a rearwardly extending flange upon which said base flange is seated and secured, circumferentially spaced portions of said second flange being depressed radially inwardly forming spaced opposed faces on said flanges; a trim ring for disposition on said wheel and substantially concealing the junction of said rim and body part, said ring having a plurality of attaching fingers secured to the rear face thereof which fingers project axially rearwardly in telescoping sliding engagement with said base flange of said rim and which terminate in a tip portion bent obliquely forwardly from said base flange into biting engagement with said spaced face of said body part flange.

12. In a wheel assembly including a wheel having rim and body parts, said rim part including a base flange and body part including a rearwardly extending flange upon which said base flange is seated and secured, circumferentially spaced portions of said second flange being depressed radially inwardly forming spaced opposed faces on said flanges; a trim ring for disposition on said wheel having an annular depressed intermediate portion forming an annular ridge on the rear face thereof, and a plurality of attaching fingers each having a base portion lying in intimate contact with the rear face of said ring radially outwardly of said ridge and being secured thereto, and each of said fingers being bent over and seated in intimate contact on said ridge and then extending generally axially rearwardly in telescoping sliding engagement with said base flange of said rim, and terminating in a tip portion which extends obliquely forwardly from said base flange into biting engagement with said spaced face of said body part flange.

13. In a wheel assembly including a wheel having rim and body parts, said rim part including a base flange and said body part including a rearwardly extending flange upon which said base flange is seated and secured, circumferentially spaced portions of said second flange being depressed radially inwardly forming spaced opposed faces on said flanges; a trim ring for disposition on said wheel having an annular depressed intermediate portion forming an annular ridge on the rear face thereof, and a plurality of attaching fingers each having a base portion lying in intimate contact with the rear face of said ring radially outwardly of said ridge and being secured thereto, and each of said fingers being bent over and seated in intimate contact on said ridge and then extending generally axially rearwardly in telescoping sliding engagement with said base flange of said rim, and terminating in a tip portion which extends obliquely forwardly from said base flange into biting engagement with said spaced face of said body part flange, the radial inner edge of said ring being seated on said body part of said wheel and the radial outer edge of said ring being spaced from said rim part when said trim ring is in mounted engagement on said wheel.

GEORGE ALBERT LYON.